United States Patent [19]
Chang

[11] Patent Number: 5,694,290
[45] Date of Patent: Dec. 2, 1997

[54] REPLACEABLE HARD DISK DRIVE BOX STRUCTURE

[76] Inventor: Cheng-Chun Chang, 11F-2, No.11, 202 Lane, Jing-Shing Rd., Wen-Shan Dt, Taipei, Taiwan

[21] Appl. No.: 753,189

[22] Filed: Nov. 21, 1996

[51] Int. Cl.$^6$ .............................. G06F 1/16; H05K 7/02; G11B 33/02
[52] U.S. Cl. ........................................ 361/685; 361/727
[58] Field of Search .................... 364/708.1; 439/928.1; 312/223.2; 361/683–685, 725–727

[56] References Cited

U.S. PATENT DOCUMENTS

| | | | |
|---|---|---|---|
| 5,229,919 | 7/1993 | Chen | 361/685 |
| 5,442,513 | 8/1995 | Lo | 361/685 |
| 5,557,499 | 9/1996 | Reiter et al. | 361/685 |
| 5,563,767 | 10/1996 | Chen | 361/685 |

*Primary Examiner*—Michael W. Phillips
*Attorney, Agent, or Firm*—Donald C. Casey

[57] ABSTRACT

A replaceable hard disk drive box structure including a box body and a securing seat accommodating the box body. The box body comprises a base, an inner face plate, an upper cover, and a handle. The inner face plate has two outwardly projecting mounting portions for accommodating respective fans. An identification code display is disposed between the mounting portions to allow the user to directly locate the hard disk on the SCSI interface. The outer ends of the inner face plate are respectively provided with coupling portions for connecting the handle. The handle has a projection resembling a quadrant of a circle at either end thereof so that the curvature of the projection of the handle may urge against a rectangular recess at either end of an access of the securing seat when the box body is pulled out, so that the connecting ports of the box body and the securing seat may smoothly disengage, achieving fast and easy installation and removal. A concealed fan is further disposed at the rear end of the securing seat for dissipating the heat of the hard disk. The concealed fan works in cooperation with the fans at the inner face plate to generate a continuous flow of air through the hard disk drive box to ensure a quick and circulation of air to enhance dissipation of heat.

4 Claims, 9 Drawing Sheets

REPLACEABLE HARD DISK DRIVE BOX STRUCTURE

BACKGROUND OF THE INVENTION

1. Field of the Invention

The present invention relates generally to a replaceable hard disk drive box structure, and more particularly to a replaceable hard disk drive box which allows for fast and smooth installation, speedy identification of the the identification code of the SCSI expansion slot, and quick internal air circulation to enhance the dissipation of the heat of the hard disk.

2. Description of the Prior Art

A conventional replaceable hard disk drive box is shown in FIG. 1A. It is characterized in that an upper cover 10 is provided with an elastic hook 11 at one side for engaging a slide block 13 and a small spring 14 of a lower cover 12. A handle 15 at a front end of the lower cover 12 is utilized to act on the projections 16 at both sides of a front end of the upper cover 10 so that the upper cover 10 may displace rearwardly to allow smooth separation of the connecting ports. However, such a structure requires more components, and the handle 15 has to be locked by means of screws 17 to the lower cover 12, which is inconvenient and time-consumptive during installation, as well as costly. As shown in FIG. 1B, another conventional replaceable hard disk drive box essentially comprises a securing frame A and a box body B having a plurality of ventilating slots C. Under prolonged use, the heat of the hard disk cannot be effectively dissipated. As a result of the heat, the read-write head will be burnt. With reference to FIG. 2, the conventional hard disk drive box shown therein also comprises a frame 20 and a box body 21. Although an air vent 22 and a fan 23 are disposed at opposite sides of the hard disk drive box for inducing the ambient air via the air vent 22 into the hard disk drive box and dissipating the heat of a hard disk drive 24, since the hard disk drive 24 is disposed inside the hard disk drive box, the circulation of the air is obstructed so that heat dissipation effects are not satisfactory.

SUMMARY OF THE INVENTION

Accordingly, a primary object of the present invention is to provide a replaceable hard disk drive box comprising a box body accommodated in a securing seat. The box body comprises a base, an upper cover, a replaceable inner face plate, and a handle. The base engages the inner face plate. The outer ends of the inner face plate are provided with respective coupling portions for engaging the ends of the handle without the need for locking screws. The respective outer sides of the ends of the handle are each provided with a projection resembling a quadrant of a circle. When the box body is installed in the securing seat, the projections may engage the corresponding rectangular recesses of the securing seat during installation. And the curved portions of the projections may urge against the recesses during removal of the box body from the securing seat so that the box body may be pulled outwardly to a certain distance, allowing smooth separation of the connecting ports, thus achieving fast and easy installation and removal, as well as reducing costs.

Another object of the present invention is to provide a replaceable hard disk drive box having an inner face plate provided with two outwardly projecting mounting recesses for accommodating respective fans for inducing cool air from the outside, and a concealed fan located at a rear end of a securing seat for dissipating the heat of the hard disk so that the securing seat appears integral and pleasing. The fans in the inner face plate and the concealed fan cooperate to generate a continuous flow of air to speed up air circulation inside the hard disk drive box to enhance dissipation of heat.

A further object of the present invention is to provide a replaceable hard disk drive box having an inner face plate which has a mounting hole between two mounting portions accommodating respective fans for mounting a digital display that may display the identification code of the hard disk so that the user may directly identify the location of the hard disk on the SCSI interface so that it is not necessary to dismantle the computer when expanding the hard disk, preventing erroneous setting.

Still another object of the present invention is to provide a replaceable hard disk drive box in which the mounting portions of the inner face plate, the base and upper cover of the box body are provided with multiple transverse ventilating slots, which cooperate with the fans of the inner face plate and the concealed fan of the securing seat to facilitate internal air circulation to enhance heat dissipation.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1A:
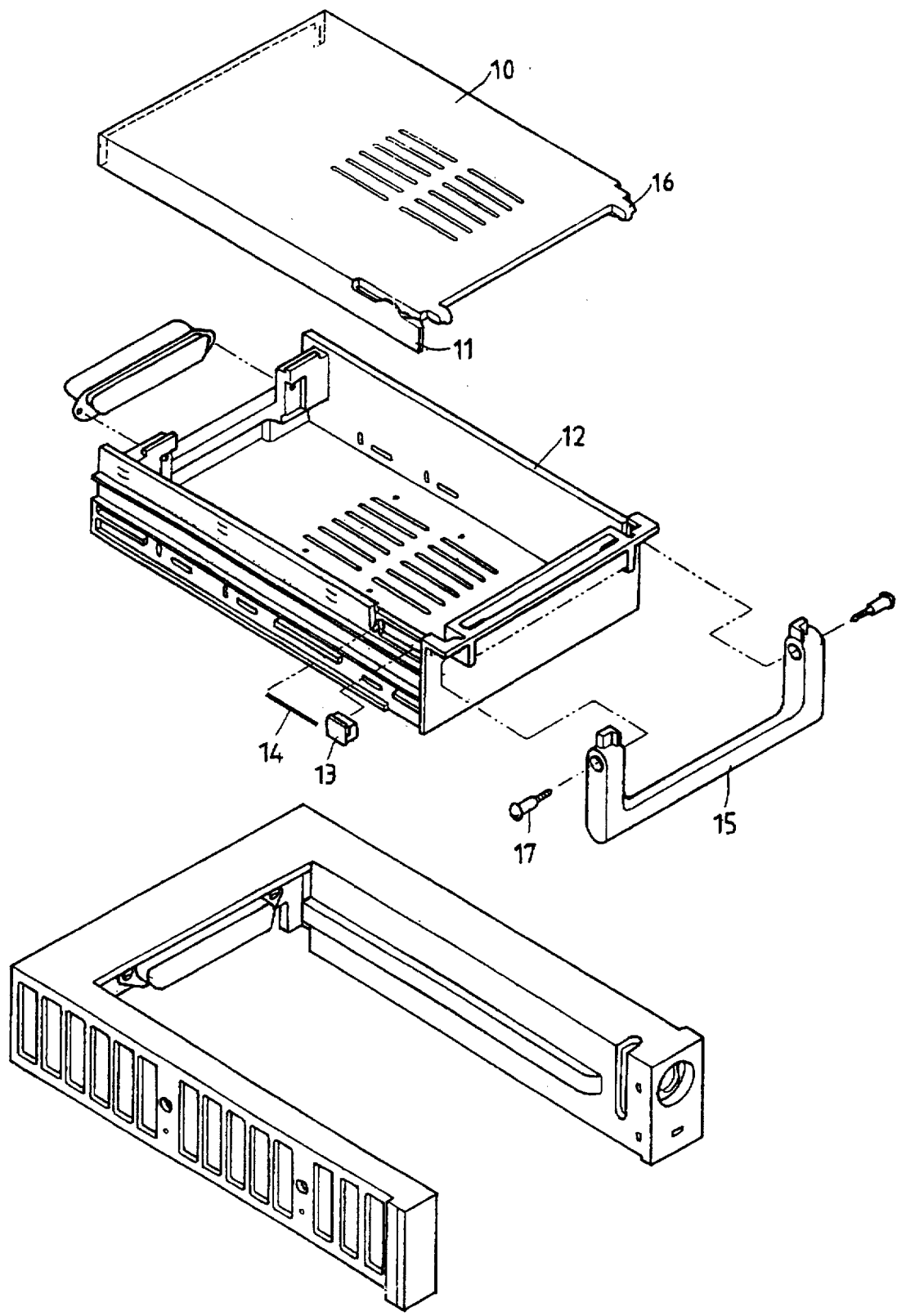
FIGS. 1A and 1B are respective elevational exploded views of the prior art.
Figure 1B:
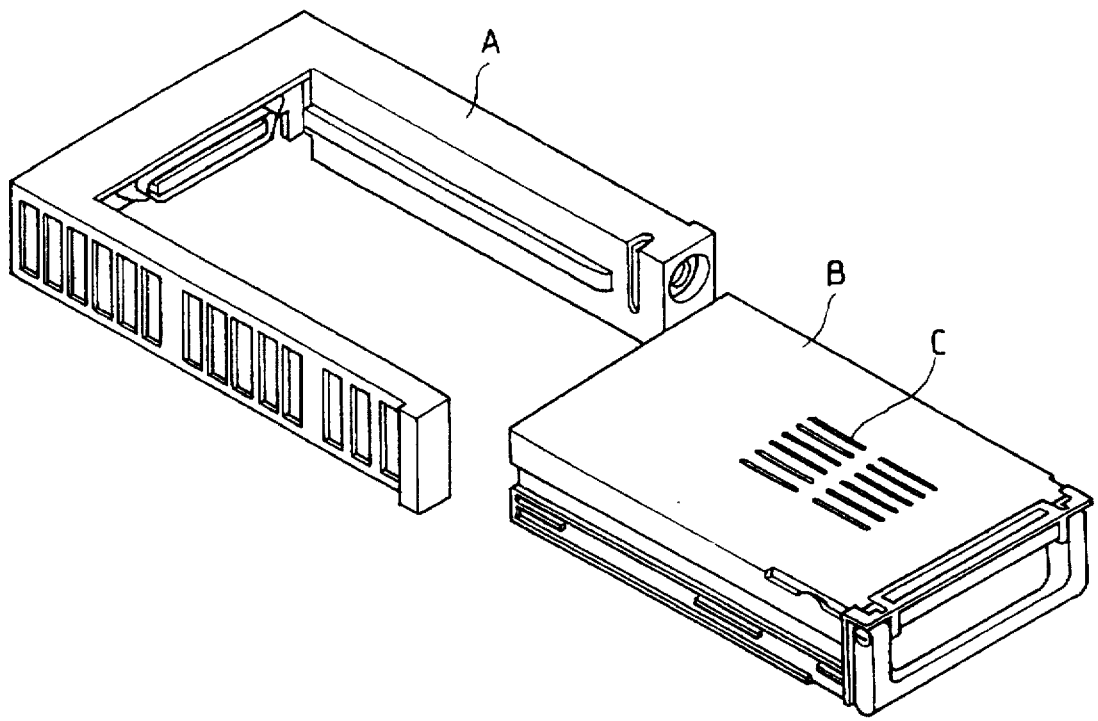
Figure 2:
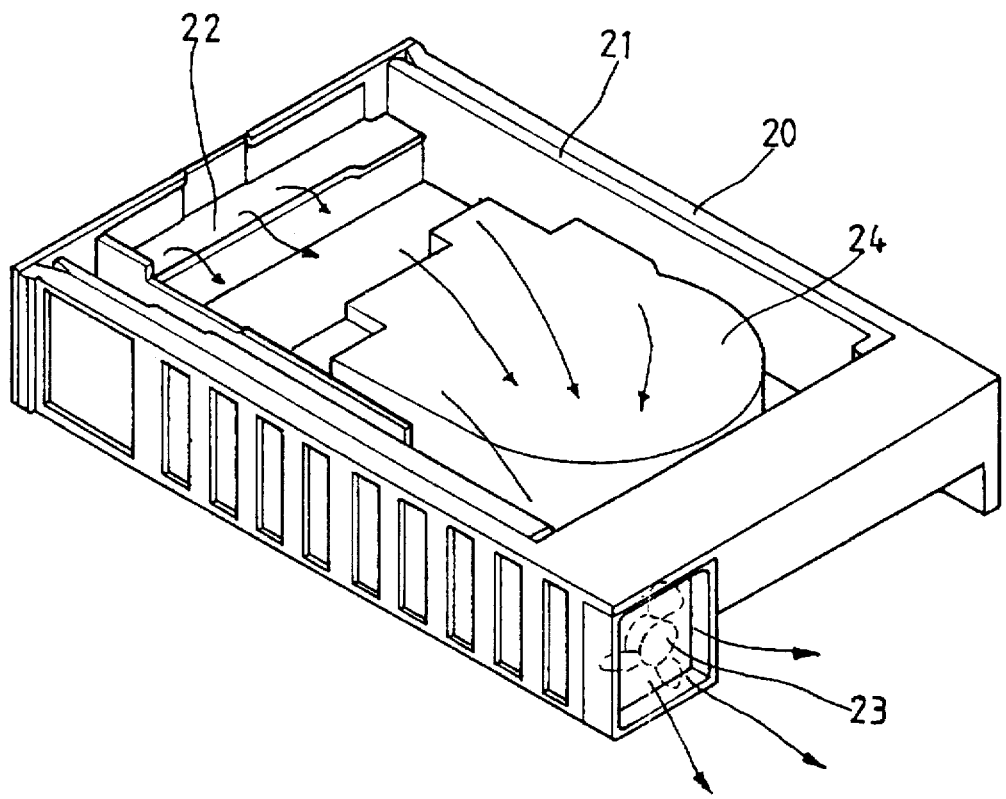
FIG. 2 is a schematic structural view of the prior art.
Figure 3:
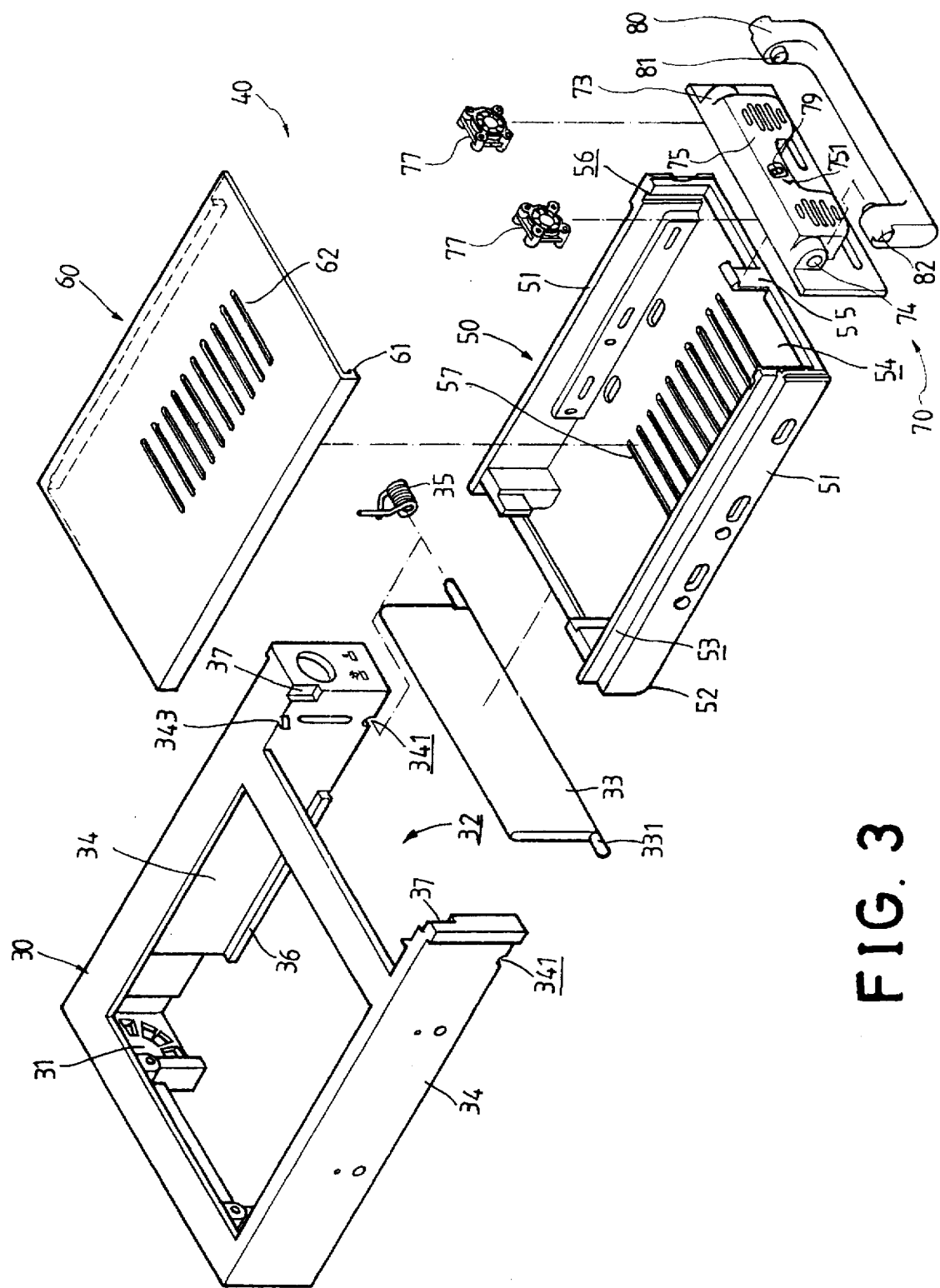
FIG. 3 is an elevational exploded view of the present invention.
Figure 4:
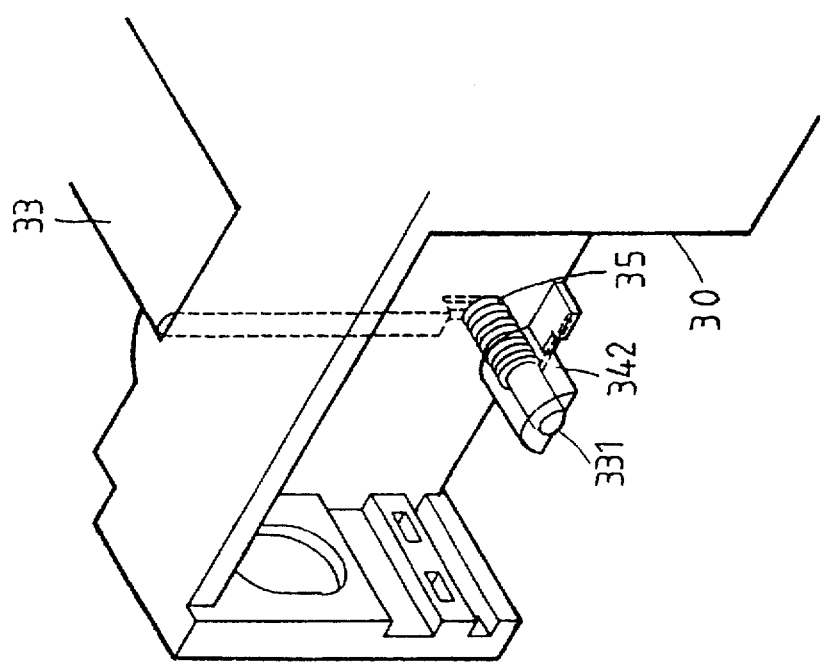
FIG. 4 is a partially enlarged view illustrating the coupling of the securing seat and the door plate according to the present invention.

With reference to FIG. 3, an elevational exploded view of the present invention, the replaceable hard disk drive box according to the present invention essentially comprises a securing seat 30 and a box body 40. The securing seat 30 is provided for containing the box body 40 and is provided with a concealed fan 31 at a rear end thereof so that the securing seat 30 appears from the front to have an integrally formed and smooth shape, which is relatively pleasing and safe. The securing seat 30 is further provided with an access 32 at a front end thereof for the access of the box body 40 during installation or removal. A door plate 33 is disposed at the front of the access 32 and has a pivot rod 331 extending from either end thereof. Besides, two lateral walls 34 of the securing seat 30 are each provided with a slot 341 near the bottom edge of the either end of the access 32 at a suitable position. One of the lateral walls 34 is provided with a coupling portion 342 (as shown in FIG. 4) at an outer sides thereof with respect to the slot 341 so that, by using a spring 35, one of the pivot rods 331 of the door plate 33 may be coupled to the coupling portion 342 and the door plate 33 may be assembled at the access 32, thus enabling the door plate 33 to turn rearwardly with the pivot rods 331 as the center. Furthermore, due to the resilience of the spring 35 allowing the door plate 33 to reset to its original position, the door plate 33 may act as a gate to prevent entry of dust and enhance the appearance of the computer and the closure of the housing. The above-mentioned slot 341 has an upper end extending inwardly to form a stop block 343 for positioning the door plate 33. The bottom edges of the two lateral walls 34 of the securing seat 30 extend inwardly to form respective strips 36. The strips 36 act as rails for the insertion of the box body 40 into the interior of the securing seat 30. Additionally, the lateral walls 34 are provided with respective rectangular recesses 37 at their inner sides at the access 32.

The box body 40 comprises a base 50, an upper cover 60, an inner face plate 70, and a handle 80. The base 50 is provided to accommodate a hard disk drive and has two side walls 51. The rear edges of the two side walls 51 form respective curved sections 52 to enable easy insertion of the box body 40 into the securing seat 30 and prevent the door plate 33 from cracking or breaking. The respective upper edges of the two lateral walls 51 of the base 50 are provided with respective rails 53 for mounting of the upper cover 60. The base 50 is also provided with an access 54 which has a retaining projection 55 located at a suitable position. The lateral walls 51 of the base 50 are provided with respective recesses 56 near the access 54.

Figure 5:
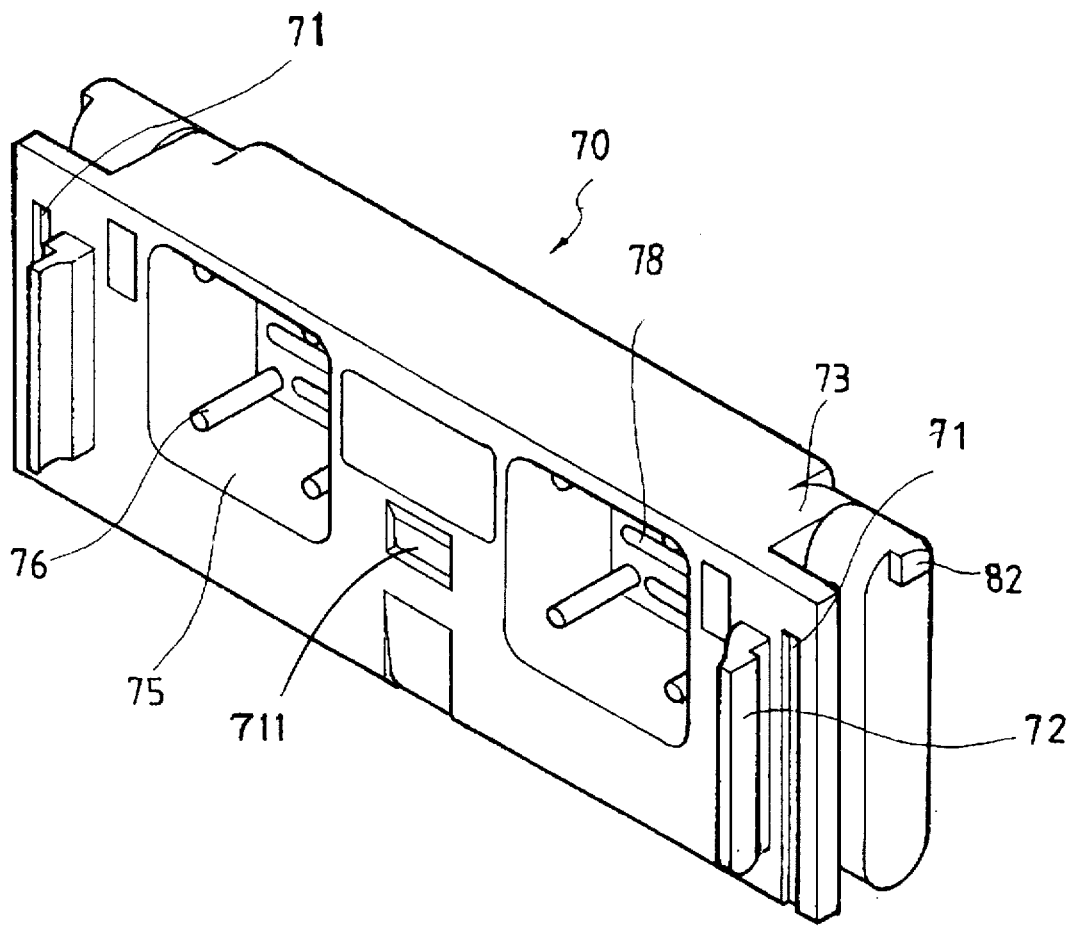
FIG. 5 is a rear elevational view of the inner face plate.

As shown in FIG. 5, the inner face plate 70 is provided with a corresponding engaging hole 711 with respect to the retaining projection 55 of the base 50. On one side thereof, the inner fate plate 70 has two raised portions 72 for matching the recesses 56 of the base 50. By means of the raised portions 72 engaging the recesses 56 and the engaging hole 71 retaining the projection 55, the inner face plate 70 may be installed at the access 54 of the base 50, defining an enclosed space. On the other side of the inner face plate 70 is provided a projecting coupling post 73 at either side. The coupling post 73 has a coupling hole 74 at an outer side for mounting of the handle 80. In addition, the inner face plate 70 is replaceable according to needs. Furthermore, the inner face plate 70 is provided with two outwardly projecting mounting portions 75 each accommodating four posts 76 (as shown in FIG. 5) for the mounting of a fan 77. The outer side of each mounting portion 75 is provided with a plurality of ventilating slots 78. A mounting hole 751 is disposed between the two mounting portions 75 for the installation of a digital display 79 to display the identification code of the hard disk drive mounted on the SCSI interface.

The handle 80 is substantially an inverted U-shaped structure having a coupling post 81 at either end for engaging the coupling holes 74 of the inner face plate 70 such that the handle 80 may be turned through an angle with the coupling holes 74 as centers. Opposite to the coupling post 81 on the outer side of each end of the handle 80, the handle 80 is provided with a projection 82 resembling a quadrant of a circle, which extends outwardly therefrom so that, after the handle 80 is assembled to the inner face plate 70, it projects from either outer side of the inner face plate 70.

Either side of a bottom side of the upper cover 60 is provided with a substantially L-shaped engaging strip 61 for engaging the rails of the base 50 to constitute the box body 40. In addition, the base 50 and the upper cover 60 are respectively provided with a plurality of transverse ventilating slots 57 and 62, which work in conjunction with the above-mentioned fans 31 and 77 to permit smooth and fast circulation of air so as to enhance the dissipation of heat of the hard disk.

Figure 6:
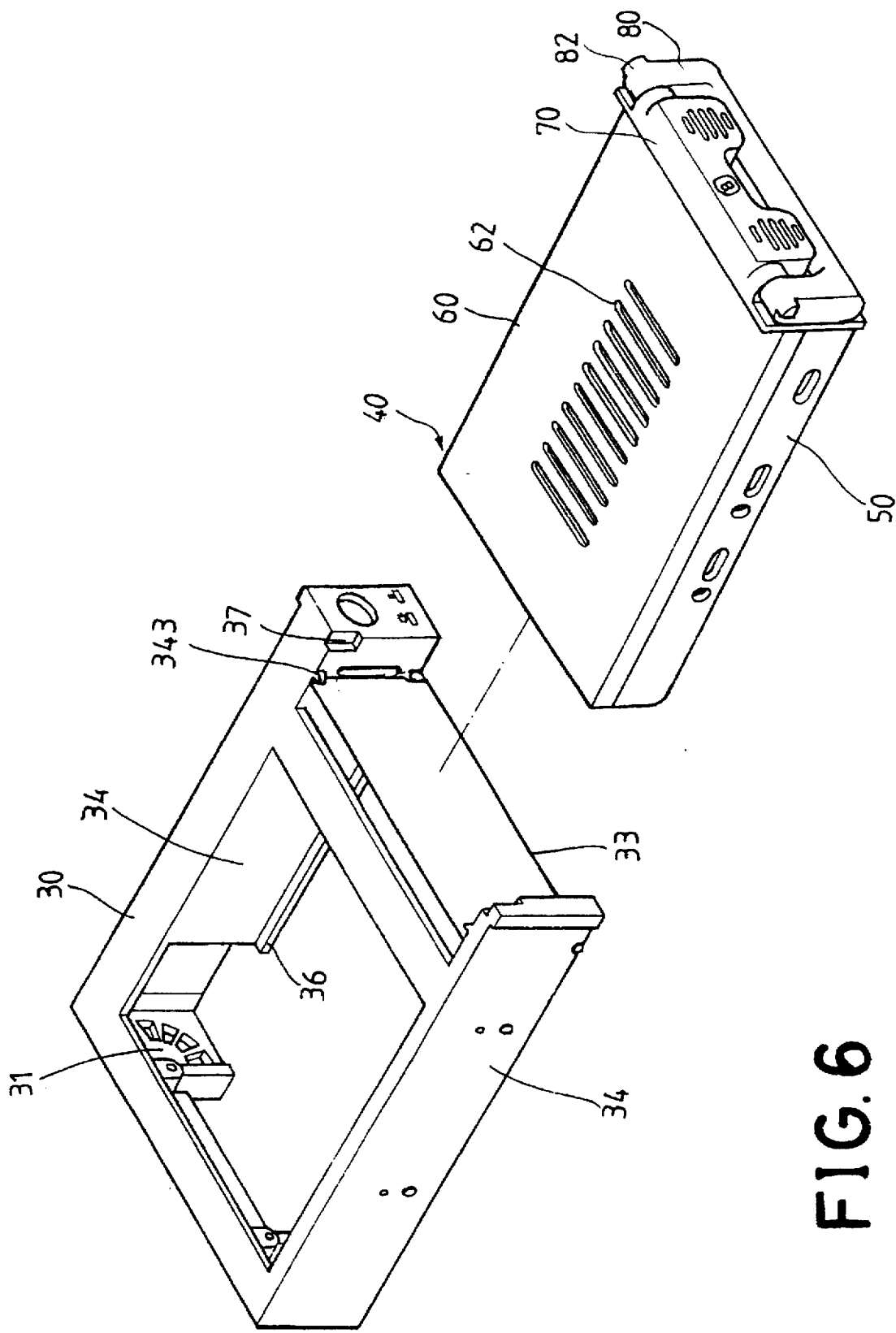
FIG. 6 is an elevational view illustrating the assembled box body and the securing seat according to the present invention.

As shown in FIG. 6, the box body 40 is pushed into the securing seat 30, and the door plate 33 is pushed downwardly to close the access 32. The box body 40 is immediately moves along the tracks formed by the strips 36 further into the securing seat 30 until the inner face plate 70 abuts the stop blocks 343 above, completing the installation procedures. At this point, the right angle section of the projections 82 of the handle 80 will just fit into the rectangular recesses 37 of the base 50.

Figure 7:
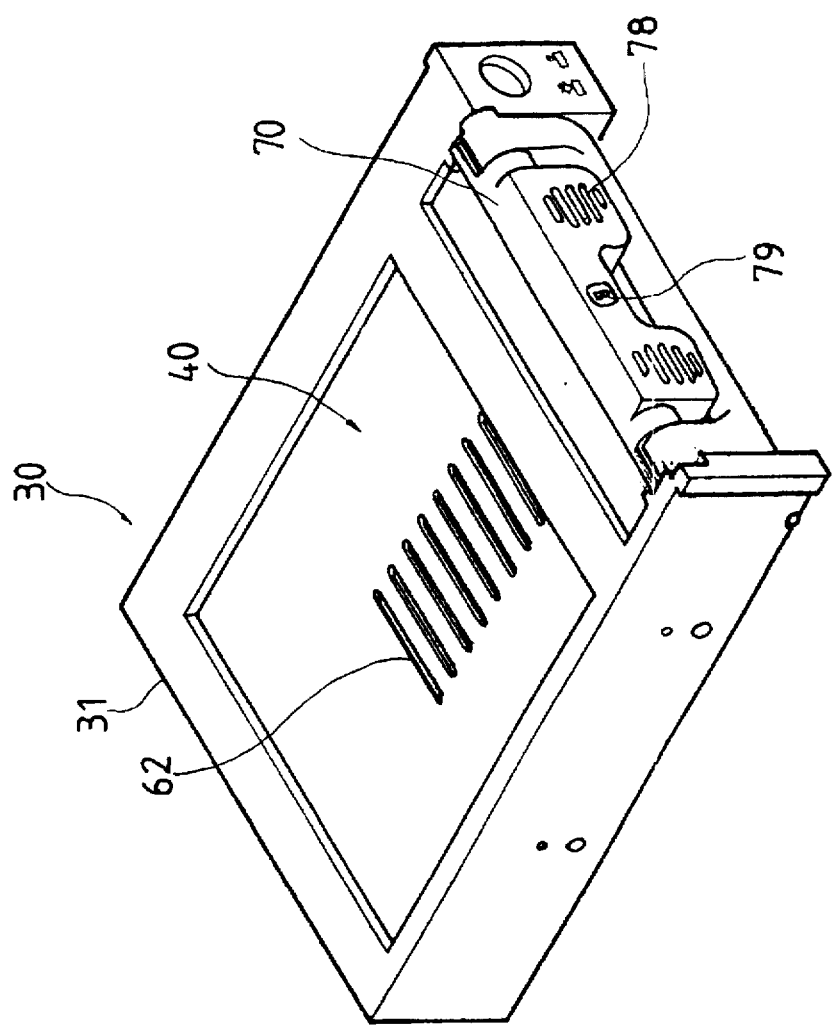
FIG. 7 is an elevational view illustrating the installation of the box body into the securing seat according to the present invention.

As shown in FIG. 7, after the box body 40 has been installed in the securing seat 30, since the concealed fan 31 helps dissipate the heat generated by the hard disk to the outside and induce the ambient air into the box body 40 via the ventilating slots 57 and 62, and since the two fans 77 mounted on the inner face plate 70 induce in cool air via the ventilating slots 78, the induced air is drawn by the air dissipated by the concealed fan 31 so that a continuous air current from an air inlet to an air outlet is generated, resulting in a quicker and smoother flow of the air to enhance the dissipation of heat generated by the hard disk. Furthermore, since the inner face plate is provided with the digital display 79 for indicating the identification code of the hard disk on the SCSI interface, the user may directly identify the location of hard disk on the SCSI interface so that it is not necessary to dismantle the computer when expanding the hard disk, preventing erroneous setting.

Figure 8:
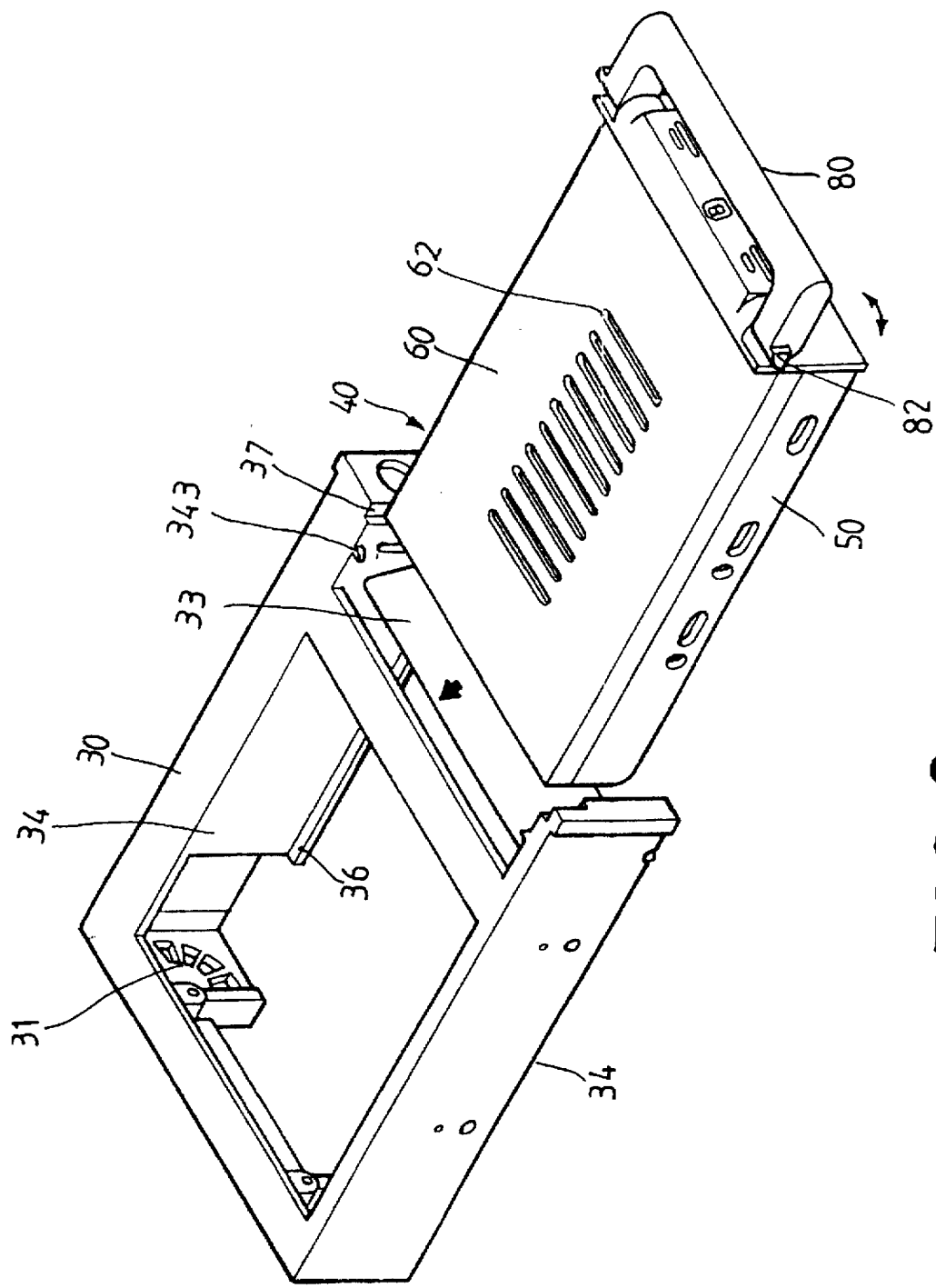
FIG. 8 is a schematic view illustrating the removal of the box body from the securing seat according to the present invention.

As shown in FIG. 8, when removing the box body 40, the handle 80 is turned upwardly through an angle so that the quadrant section of each projection 82 of the hand 80 urges against the corresponding rectangular recess 37, allowing the box body 40 to be pulled outwardly from the securing seat 30 to a certain extent such that a connecting port may just smoothly disengage from the securing seat 30. After the box body 40 is pulled out, the door plate 33 will be reset to its original position by the spring 35 and will conceal the access 32 of the securing seat 30.

Although the present invention has been illustrated and described with reference to the preferred embodiment thereof, it should be understood that it is in no way limited to the details of such embodiment but is capable of numerous modifications within the scope of the appended claims.

What is claimed is:

1. A replaceable hard disk drive box structure, comprising:

a securing seat having an access provided with a door plate, said door plate having a pivot rod at either end of a bottom edge thereof, said securing seat having two lateral walls having respective slots disposed at their bottom edges near said first access one of said lateral walls further having a respective coupling portion disposed on the side opposite to the respective slots, a spring being used to mount one pivot rod of said door plate to said first access of said securing seat so that said door plate may turn rearwardly with said pivot rod as a center of rotation, said slots of each of said lateral walls extending upwardly to form respective stop blocks for positioning said door plate; said bottom edges of said lateral walls extending inwardly to form respective lateral strips, and respective rectangular recesses being disposed at inner sides of said access; and a box body comprising a base, an upper cover, an inner face, plate and a handle, said base having two side walls having respective rails for mounting said upper cover and a retaining projection at a second access thereof said base further having respective recesses at the sides of said access thereof; said inner face plate having a corresponding engaging hole with respect to said retaining projection of said base, said inner face plate having on one side thereof two raised portions for matching said recesses of said base, said face plate being installed at said second access of said base by means of said raised portions engaging said recesses of said base and said engaging hole retaining said retaining projection, said inner face plate having on the other side thereof respective projecting coupling posts at both ends, each of said coupling posts having a coupling hole at an outer side for mounting of said handle; said handle being a substantially inverted U-shaped structure provided with facing coupling posts at the inner sides of its two ends for engaging said coupling holes of said inner face plate such that said handle may turn with said coupling holes as centers of rotation, a projection resembling a quadrant of a circle extending from the outer sides of the ends of said handle such that it may project from either side of said inner face plate; said upper cover having having respective L-shaped engaging strips at both lateral sides of a bottom side thereof for engaging said rails of said base so as to constitute said box body.

2. A replaceable hard disk drive box structure as claimed in claim 1, wherein said inner face plate has two outwardly projecting mounting portions having four posts for mounting of respective fans, an outer side of each of said mounting portions being provided with a plurality of ventilating slots, and a mounting hole being disposed between said mounting portions for mounting of a digital display for indicating the identification code of a hard disk on a SCSI interface; and said inner face plate is replaceable.

3. A replaceable hard disk drive box structure as claimed in claim 1, wherein said securing seat has a concealed fan at a rear end thereof.

4. A replaceable hard disk drive box structure as claimed in claim 1, wherein the rear ends of said lateral walls of said securing seat are configured to be curved; and said base and said upper cover are respectively provided with a plurality of transverse ventilating slots.

\* \* \* \* \*